United States Patent [19]
Hand

[11] Patent Number: 5,067,439
[45] Date of Patent: Nov. 26, 1991

[54] AQUARIUM HYDRO HI-RISE AND CROSSOVER BRIDGE ASSEMBLY

[76] Inventor: William A. Hand, 3161 Sullivant Ave., Columbus, Ohio 43204

[21] Appl. No.: 608,361

[22] Filed: Nov. 2, 1990

[51] Int. Cl.⁵ .............................................. A01K 63/00
[52] U.S. Cl. .................................................... 119/5
[58] Field of Search ............................................ 119/5

[56]  References Cited
U.S. PATENT DOCUMENTS

| | | | |
|---|---|---|---|
| D. 84,002 | 4/1931 | Smith | 119/5 X |
| 192,595 | 7/1877 | Palen et al. | 119/5 X |
| 1,576,462 | 3/1926 | Polzin | 119/5 |
| 1,943,417 | 9/1932 | Bringman | 119/5 |
| 2,059,927 | 11/1936 | Beck | 61/21 |
| 2,512,678 | 6/1950 | Rice | 119/5 |
| 3,903,844 | 9/1975 | Greenia | 119/5 |
| 3,921,583 | 11/1975 | De Shores | 119/5 |
| 3,991,715 | 11/1976 | Gibson, Jr. | 119/5 |
| 4,044,721 | 8/1977 | Foley et al. | 119/5 |

*Primary Examiner*—Robert P. Swiatek
*Attorney, Agent, or Firm*—Watkins, Dunbar & Pollick

[57] ABSTRACT

A system is provided which facilitates the filling and operation of a crossover bridge (30) for aquarium tanks (12, 40). A pump (58) is combined with a plurality of end sealing devices (56, 72) and a closeable aperture (38) in an intermediate vacuum portion (36) of the device to make the filling mode simplified and convenient.

8 Claims, 3 Drawing Sheets

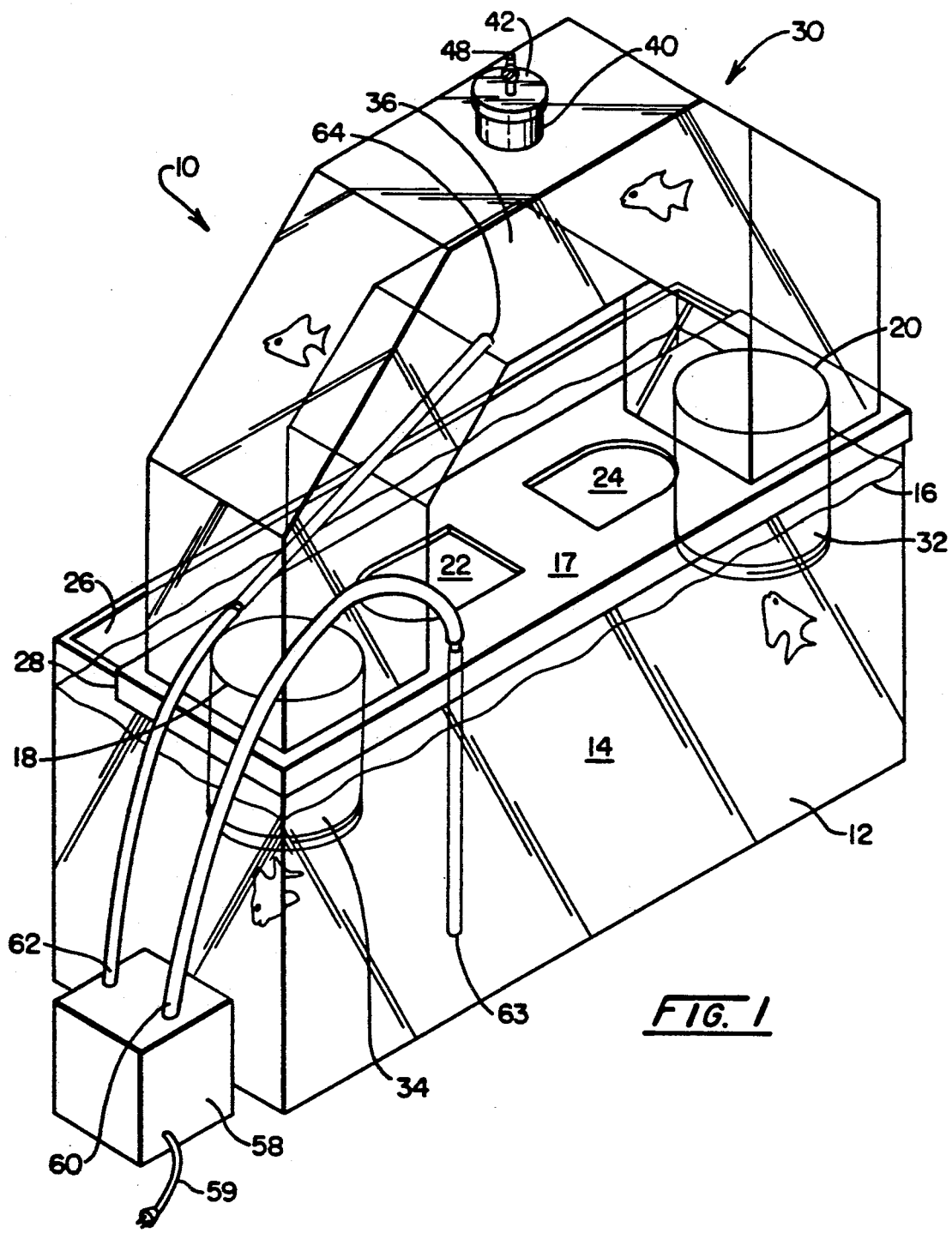
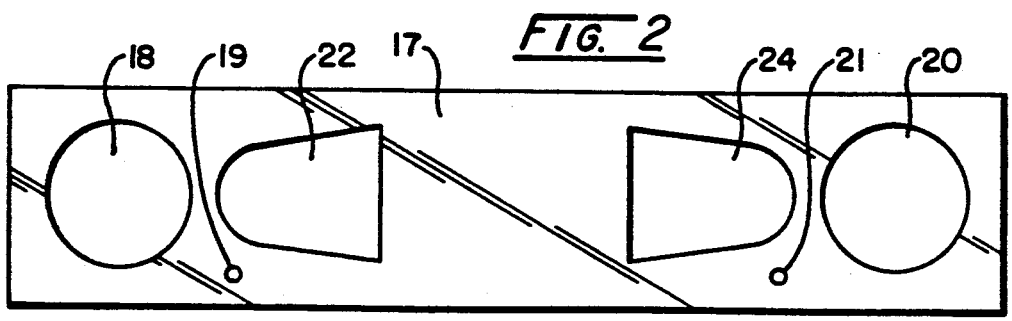

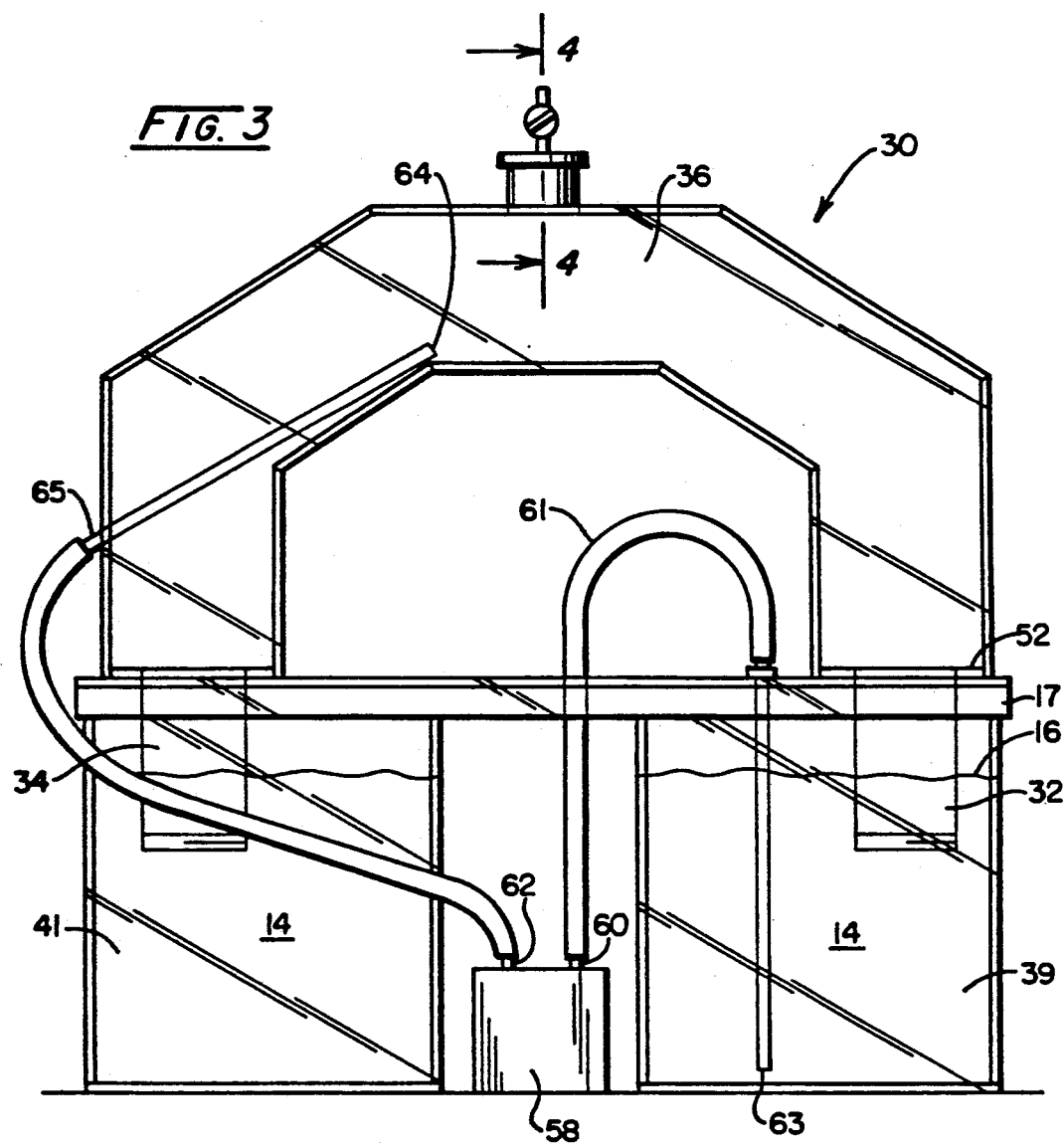
FIG. 3
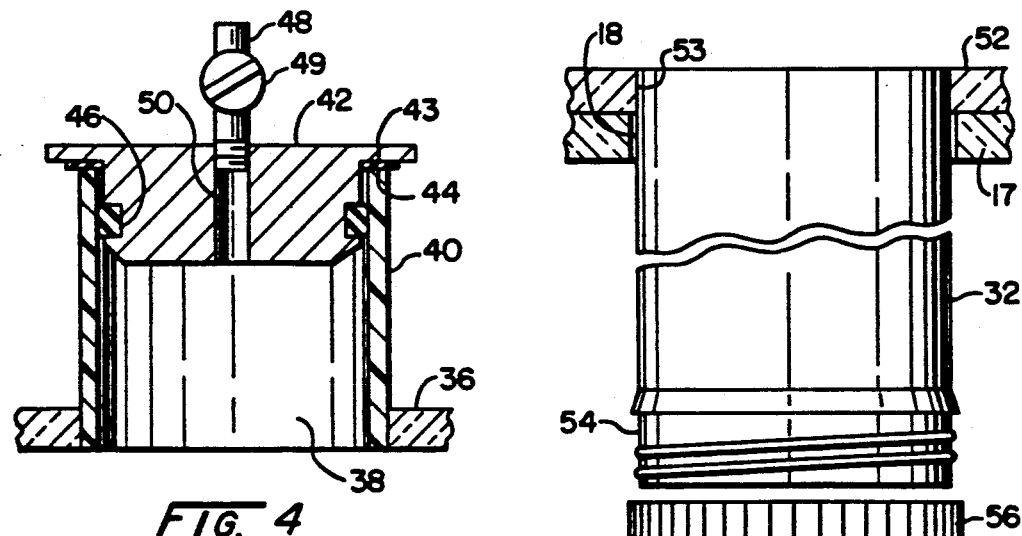
FIG. 4
FIG. 5

AQUARIUM HYDRO HI-RISE AND CROSSOVER BRIDGE ASSEMBLY

FIELD OF INVENTION

This invention relates to enhancements in construction of aquariums and channels for the passage of fish and other aquatic life. More particularly it relates to bridge elements for the passage of display fish in aquariums.

BACKGROUND OF INVENTION

Hobbyist and decorators have pursued the objective of enhancing the appearance and enjoyment of aquariums and fish tanks in various ways for many years. The equipment provided is varied and multifaceted to provide unusual visual effects.

It is well recognized that it is entertaining and visually stimulating to watch the operations of an aquarium and the motion of the fish and other aquatic life moving in the atmosphere of green life, water, and lighted reflections. Novel enhancements to these perceptions have been sought and are well recognized and valuable and useful to the viewer as well as to those in the business of providing components to the construction and operation of aquariums.

One visual effect that has been pursued is the provision of passages and compartments as exemplified by the following U. S. Patents:

U.S. Pat. No. 4,044,721 Foley et al. discloses a fish tank construction which is made with interior partitions through which the fish can swim into simulated rooms in a simulated house.

U.S. Pat. No. 3,991,715 Gibson Jr. reveals an aquarium with an arch channel, or bridge, over which the fish can swim. The bridge channel is semicircular and includes a magnifying glass at the top of the bridge to give a larger view of the fish. The bridge can go from one aquarium to the next (see FIG. 4).

U.S. Pat. No. 3,921,583 De Shores shows fish channels from one aquarium end tank to another. U.S. Pat. No. 3,903,844 Greenia describes an aquarium with various angled bridge channels having a triangular cross-section.

U.S. Pat. No. 2,512,678 Rice discloses a fish bowl with an over-the-top molded channel. U.S. Pat. No. 2,059,927 Beck reveals an early version of a bridge channel showing gates for filling purposes (see FIG. 6).

U.S. Pat. No. 1,943,417 Bringman shows a crown attachment for aquarium tanks in which the fish swim up over a bridge. U.S. Pat. No. 1,576,462 Polzin contains a early disclosure of the general concept of fish bridges.

This invention is directed to those aquatic bridges which span from one surface of water or tank to another.

The prior art devices have been difficult to install and maintain for various reasons. One problem or difficulty is filling the bridge with water and maintaining the bridge completely full so that there is a complete path of water for the fish to swim from one end of the bridge to the other. Naturally, if the water does not completely cross from one end of the bridge to the other in sufficient depth for the fish to swim all the way across, the device has loss its primary usefulness and attractiveness. In the prior art devices it has been apparently necessary to fill the bridge in the inverted position in the manner of filling a "U-shaped" tube which naturally seeks an equal level in both upward extending legs of the device. When the device has been filled then it must be inverted and placed into the aquarium without losing the filled water from the legs. U.S. Pat. No. 2,059,927 is representative of this. The bridge, in normal operation, is maintained full by the vacuum created at the inner, uppermost segment of the bridge. If the water in one leg or the other can flow out, the vacuum will be broken as pressure will reach the "vacuum" segment.

In order to overcome these problems this invention provides at least one of the combination of several construction features. One feature is the provision of watertight caps on the ends of the device which are closed while the device is filled.

The other feature is the provision of a vacuum release vent and/or capping means at the operational vacuum segment.

By means of these features, the filling and installation operation is greatly simplified.

SUMMARY OF THE INVENTION

In summary, this invention is an aquarium construction and system which includes one or more open top aquarium tanks which contain water and aquatic life such as fish. When the system is used with one tank it is considered in the Hi-Rise configuration, and when it is used with two or more tanks it is considered in the Crossover configuration. There is a cover over the tank or tanks and a plurality of apertures in the cover. A crossover bridge is constructed to provide a continuous volume of water between separated positions on the surface of the water of the tank or tanks. The crossover bridge is a walled, continuous, tube-like, hollow structure having opposite ends with a formed intermediate portion therebetween. There are included first and second water sealing and capping means at the ends which are operable to close the ends during the filling mode and to open the ends during the operating mode. The bridge is provided with an aperture in the walls in the intermediate portion and is further provided with a third water sealing capping means on the aperture that is operable to open the aperture during the filling mode and to close the aperture during the operating mode.

As a means of filling the system, a pump may be provided having an inlet and an outlet with conduits from them respectively, to pump water from the tank into the inlet and from the outlet to a higher point of the intermediate portion of the bridge.

In a preferred embodiment the aperture in the intermediate portion is provided with a vent cock which may be opened to release the vacuum at the aperture in the intermediate portion.

The filling mode may be carried out either by filling the crossover bridge with water from the pump; or alternatively, filling the crossover bridge by pouring water in the aperture in the intermediate portion therein.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope or sacrificing any of the advantages of the invention.

BRIEF DESCRIPTION OF THE DRAWINGS

FIG. 1 is a perspective elevational view of the aquarium construction and system of this invention showing the system completely assembled and ready for operation.

FIG. 2 is a plan view of a cover plate used in the assembly of the system in the Hi-Rise configuration.

FIG. 3 is an elevational view of the system of this invention showing the assembly with a plurality (two) of aquarium tanks in the Crossover configuration.

FIG. 4 is a sectional elevational view taken on the line 4—4 of FIG. 3.

FIG. 5 is a partial sectional elevation view of an end cap used in connection with the invention.

Figure 6:
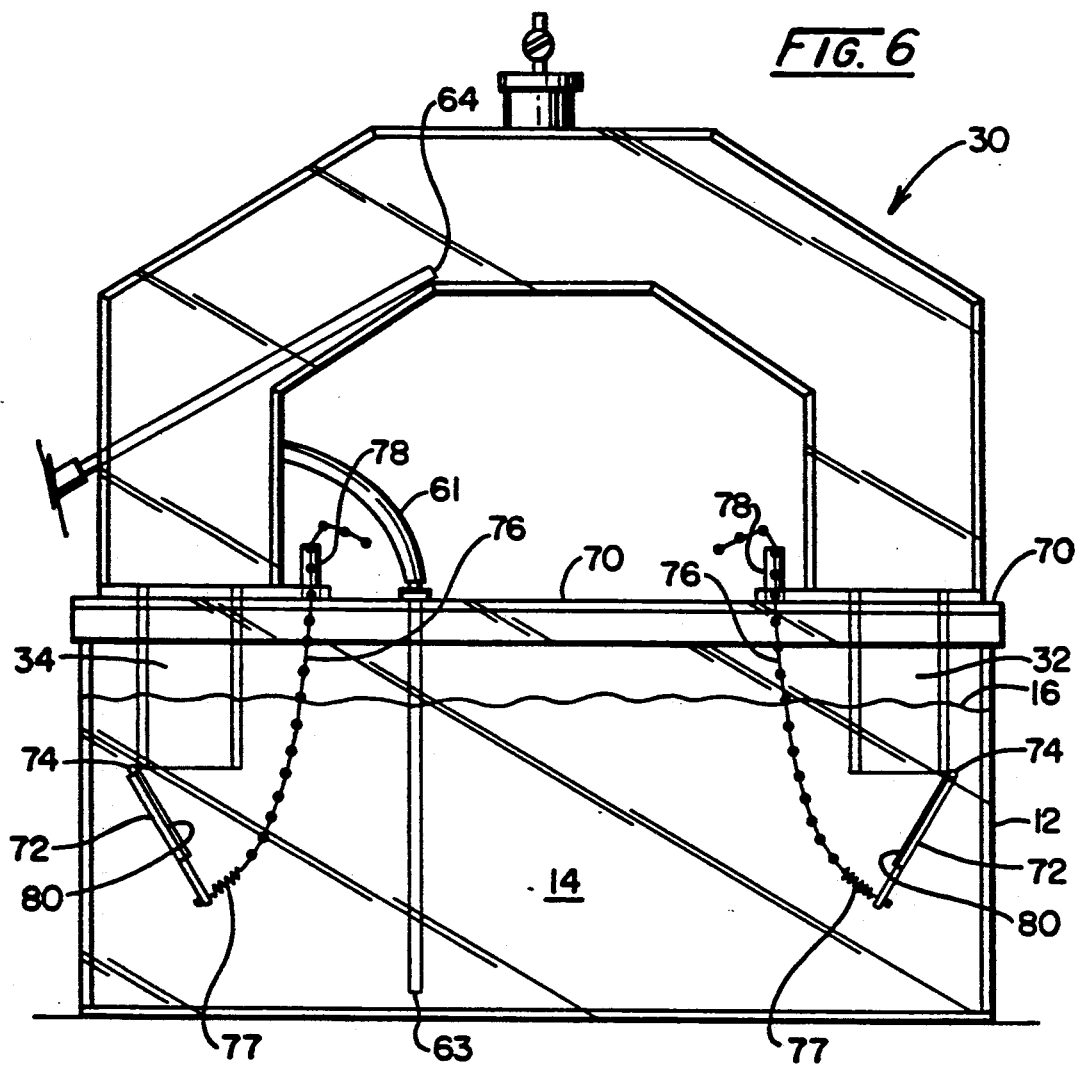
FIG. 6 is an elevational view of the system of this invention in the Hi-Rise configuration with another embodiment of capping means provided for use in the filling mode.

DETAILED DESCRIPTION OF THE PREFERRED EMBODIMENT OF THE BEST MODE OF CARRYING OUT THE INVENTION

Referring to FIG. 1 and the Hi Rise configuration, the aquarium construction and system of the invention is designated generally as 10 and includes an aquarium tank 12 shown generally in rectangular shape and constructed of transparent glass or plastic material. The tank is filled with water 14 up to a level 16. The tank 12 is provided with a cover 17 which, in the preferred form, does not completely cover the top leaving an opening 26 along one side to provide room for an aquarium light.

Referring to FIG. 2, the cover 17 is shown as generally rectangular in shape having a plurality of apertures 18, 19, 20, 21, 22, and 24. The cover 17 may be provided with overlapping lips 28 to maintain a proper cover position on top of the tank 12. The material of the cover 17 may be transparent or translucent of various colors to enhance the appearance of the aquarium and to provide decorative highlights by light reflection.

The system 10 includes an aquarium crossover bridge designated generally as 30 comprising a walled continuous tube-like hollow structure having opposite ends 32 and 34 with a formed intermediate portion 36. Intermediate portion 36 is formed generally in an inverted "U-shape" from the ends 32 and 34 through the intermediate portion 36. Other shapes may be used, if considered desirable.

In the system shown, the crossover bridge is generally square or rectangular in cross-section, but circular cross-section could be used from a structural standpoint although perhaps not as pleasing in appearance.

In the operational mode the Hi-Rise crossover bridge is preferably completely filled with water down through the ends 32 and 34 which are submerged in the water 14.

Therefore, in the operating mode, there is a continuous path of water from the tank up through the crossover bridge and down the other side also into the tank. With the continuous path of water available, fish can swim up through the crossover bridge and down the other side. The fish may be viewed more readily and their swimming paths easily observed.

In a manner similar to the construction of the tank 12 the crossover 30 may be fashioned from glass or other plastic materials. The materials may be colored and preferably transparent.

Referring to FIG. 3, in an alternate construction a plurality of aquarium tanks 39 and 41, two are shown, are provided in spaced adjacent relationship one to the next. The cover 17 is shown mounted on the top of both tanks and bridging the space between. Individual covers could be provided for each tank.

The crossover bridge 30 is shown mounted on the cover 17 at first and second ends 32 and 34, respectively. The central intermediate portion 36 completes the inverted U-shape in a manner similar to that shown in FIG. 1. In the crossover configuration, several tanks can be linked together due to the hydraulics of the crossover assembly.

Water 14 is shown in the separated tanks and in the normal circumstances will be of equal level.

Referring to FIGS. 1, 3, and 4, an aperture 38 is provided in substantially the point of the highest position in the intermediate portion 36. An upstanding connection portion 40 is fastened in the aperture 38 and provides a connecting position for a third water sealing capping means 42 which fits over the upper end 44 of the upstanding portion 40. An elastic "O"ring type seal 46 is provided in a groove in the inner annular surface of the capping means 42 to provide a vacuum seal. The seal 43 acts to prevent the admission of air from the outside into the intermediate portion 36 of the crossover bridge 30 and prevents the escape of water from the system. Capping means 42 also acts as a safety device in the event that the assembly is pumped full of water with all three openings sealed as this plug 42 will be blown out before the assembly is ruptured by build up of air pressure.

A vent cock 48 is provided at conduit 50 in the capping means 42 to provide communication to the aperture 38 through the up standing portion 40.

A cap similar to item 56 in FIG. 5 optionally can be used in place of above number 42 safety plug; however, such cap must be removed during filling with pump as an internal air pressure is developed as assembly is filled with water, as stated above.

By means of a handle 49, which may be turned, the vent cock 48 may be opened or closed. As will be later explained, the opening and closing of the vent cock 48 is useful during the filling mode.

Referring to FIG. 5, the end member 32 is shown passing through the aperture 18 in the cover plate 17. The end member 32 is preferably the same in configuration and operation as end member 34, end member 32 being shown in FIG. 5. End member 32 is passed through and sealed with bottom plate member 52 at the end of the crossover bridge 30. The fastening may be accomplished by a weld or adhesive contact 53. End member 32 is provided with a threaded portion 54 which operatively and threadedly receives a sealing end capping means 56.

Referring to FIGS. 1 and 3, a pumping means 58 is provided with an inlet 60 and an outlet 62. The pumping means is preferably powered through an electrical connection 59. Inlet 60 is connected by a conduit 61 to an entry 63 which is submerged below the level 16 of the water 14 in the tank 40.

Outlet 62 is connected to an exit 64 which is positioned juxtaposed to the higher level of the intermediate portion 36.

To activate the system 10 through the filling mode, preferably using the pump 58, the procedure is as follows:

1. Support plate assembly 17 is assembled over the tank 12.

2. Crossover bridge 30 is placed through the apertures 18 and 20 with the ends 32 and 34 passing downward through the cover plate 17. During this the caps 56 are not in place on the threads 74.

3. Sealing capping means 56 are assembled on the threaded portions 54 by reaching down through the cover plate 17 through the apertures 22 and 24.

4. The outlet 62 of the pump 58 is then connected to the conduit 65 and exit 64. The inlet 60 is connected to the conduits 61 and the entrances 63.

5. Pump 58 is operated until the crossover bridge 30 is filled into the neck of the upstanding portion 40 of the aperture 38.

6. The cap 42 is then inserted in the upstanding portion 40 and turned to pressure seal and lock cap 42 in place by means of the seals 43, 46.

7. The vent cock should be closed at this time.

8. Making sure that the water level 16 is above the ends 32 and 34, the first and second capping means 56 are removed from the ends 32 and 34 by reaching through the apertures 22 and 24 and unscrewing them from the threaded portion 54.

9. The filling mode is now complete and the system may be placed in the operating mode by starting the pump. In the operating mode the outlet of the pump may be connected through the conduit 65 or otherwise, and will circulate aerated water from the tanks through the crossover bridge.

The embodiment of FIG. 3, having a plurality of tanks 40 and 41, may be placed in the filling mode in substantially the same manner as the single tank system shown in FIG. 1. In this instance, although the ends 32 and 34 are in separate tanks, filling may be accomplished by the pump, conduit 65 and exit 64 provided that the exit 64 serves water to both sides of the crossover bridge 30.

Referring to FIG. 6 the crossover bridge 30 is situated over the tank 12 and placed upon a cover 70 as in the embodiment of FIG. 1. Tank 12 is filled with water 14 to a level 16, and filling apparatus 61, with a inlet 63, is provided through a pump (not shown) to the outlet 64. Ends 32 and 34 extend below the water level 16 into the water 14. A hinged cap 72 is provided at the terminus of the ends 32-34. Hinged end caps 72 are shown in the open position in FIG. 6. This is the normal position when the system is in the operating mode. When it is desirable to place the system in the filling mode the end caps 72 are swung on their hinges 74 upward to a closed position over the lower terminus of the ends 32, 34. A pull chain 76 with a spring 77 is provided to actuate the closing operation by pulling upward. The pull chain 76 is operable through a hollow retainer 78. A gasket 80 is provided on the face of the end caps 72 to prevent undue leakage when the end caps 72 are swung into the closed position and the springs 77 maintain tension on the closure when the chains 76 are pulled to a tight position.

Figure 7:
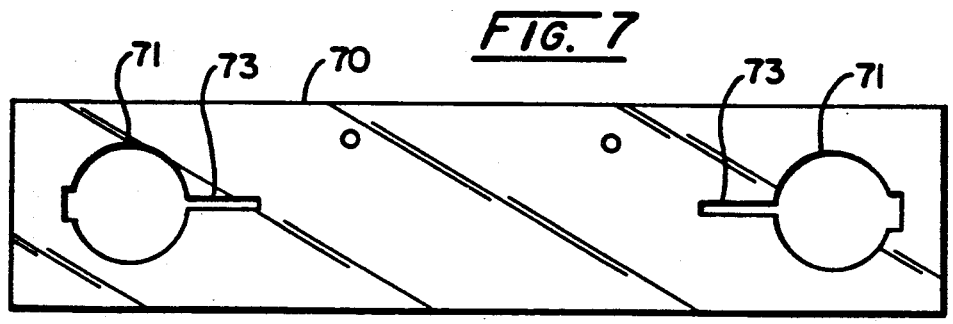
FIG. 7 is a plan view of another cover plate to be used in the assembly of the system shown in FIG. 6.

Referring to FIG. 7 the end plate 70 is provided with apertures 71 with slots 73. The apertures 71 provide a means for inserting the ends 32 and 34 into the end plate 70. The slots 73 provide space for the chains 76 to move upward in the retainers 78. Chains 76 may be anchored by detents (not shown) on the top of the retainers 78.

The embodiment of FIGS. 6 and 7 provide an alternative means of operating the system 10 in the filling mode when it is desirable to accomplish the filling operation without reaching into the tank and screwing the caps 56 on the bottom of the end caps as shown in FIG. 5.

A gasket 80 is provided on the top of the end caps 72 to provide a further seal.

An end cap may be placed on the end of the fill tube 65 when the filling operation is carried out without a pumping means 58. This is accomplished by pouring water in the extension portion 40 with the capping means 42 removed and the ends 32, 34 capped by either of the alternative means shown in FIGS. 1 and 6.

In the operating mode the level of water in the crossover bridge 30 may be adjusted by admitting air to the intermediate portion 36 by operation of the vent cock 48.

In the operating mode should fish have randomly ventured into the crossover assembly or have been physically placed in the same through the inlet and outlet ports via a net, etc., and should it be desired to have them remain there for observation, caps with holes through them can be used by screwing them onto the ends 32 and 34 so that the fish will then be encapsulated within the crossover bridge. The holes should be smaller than the size of the fish so that they cannot swim from the crossover bridge into the tank. Aerated water from the tank below will be circulated when the pump is operated.

While the above disclosure is directed to domestic aquariums, the concepts are applicable to large 50,000 gallon and larger aquariums, swimming pools, etc. simply by enlarging the assembly by increasing the size of items 10 and 30 proportionately and providing larger and sturdier supports as needed. In such larger units, large fish, even sharks or swimmers could be accommodated.

It is herein understood that although the present invention has been specifically disclosed with the preferred embodiment and examples, modifications and variations of the concepts herein disclosed may be resorted to by those skilled in the art. Such modifications and variations are considered to be within the scope of the invention and the appended claims.

What is claimed is:

1. An aquarium construction and system including:
   a. at least one open top aquarium tank to contain water and aquatic life, such as fish;
   b. a cover over the at least one tank with a plurality of apertures in each cover;
   c. a crossover bridge for providing a continuous volume of water between separated positions on the surface of the water of said at least one tank, comprising:
      i) a walled continuous tube-like hollow structure having opposite ends with a formed intermediate portion therebetween,
      ii) first and second water sealing capping means at the ends, operable to close the ends during a filling mode and to open the ends in an operating mode,
      iii) said tube-like structure having an aperture in the walls in the intermediate portion, with a third water sealing capping means on the aperture operable to open the aperture during the filling mode and to close the aperture during the operating mode, and
   d. means to provide water to the intermediate portion of the crossover bridge during the filling mode.

2. A system according to claim 1 wherein the third capping means is provided with a vacuum pressure seal in the intermediate portion of the crossover bridge structure.

3. A system according to claim 2 wherein the first and second capping means comprise threaded screw caps operable to be rotatably screwed tightly in the filling mode, and removed in the operating mode.

4. A system according to the claim 3 wherein the plurality of apertures in the cover include an aperture juxtaposed to the position of each end of the bridge structure through which a user may insert and remove the first and second end caps.

5. A system according to claim 2 wherein the first and second capping means comprise hinged rotatable caps operable to be rotatably swung to tightly cover said ends in the filling mode, and to be swung away from said ends in the operating mode.

6. A system according to claim 5 wherein the hinged rotable caps are retained in the closed position by pull chain means that are operable from a position above the water level in the at least one tank.

7. An aquarium construction and system including:
a. at least one open top aquarium tank to contain water and aquatic life, such as fish;
b. a cover over the at least one tank with a plurality of apertures in each cover;
c. a crossover bridge for providing a continuous volume of water between separated positions on the surface of the water of said at least one tank, comprising:
   i) a walled continuous tube-like hollow structure having opposite ends with a formed intermediate part therebetween,
   ii) first and second water sealing capping means at the ends, operable to close the ends during a filling mode and to open the ends in an operating mode,
   iii) said tube-like structure having an aperture in the walls in the intermediate portion, with a third water sealing capping means on the aperture operable to open the aperture during the filling mode and to close the aperture during the operating mode, and d. a pump means having an inlet and an outlet, with the outlet connected to a conduit positioned juxtaposed to a position in the intermediate portion of the crossover bridge structure, and with the inlet connected to a conduit below the surface of the water in the tank, with the pumping means operable to convey water from below the surface of the, at least one, tank to the intermediate portion of the crossover bridge structure in the filling mode.

8. An aquarium construction and system including:
a. at least one open top aquarium tank to contain water and aquatic life, such as fish;
b. a cover over at least one tank with a plurality of apertures in each cover;
c. a crossover bridge for providing a continuous volume of water between separated positions on the surface of the water of said tank, comprising:
   i) a walled continuous tube-like hollow structure having opposite ends with a formed intermediate port therebetween,
   ii) first and second water sealing capping means at the ends, operable to close the ends during a filling mode and to open the ends in an operating mode,
   iii) said tube-like structure having an aperture in the walls in the intermediate portion, with a third water sealing capping means on the aperture operable to open the aperture during the filling mode and to close the aperture during the operating mode,
   iv) venting means in the third capping means operable to be closed during the operating mode and to be open during the filling mode; and
d. a pump means having an inlet and an outlet, with the outlet connected to a conduit positioned juxtaposed to a position in the intermediate portion of the crossover bridge structure, and with the inlet connected to a conduit below the surface of the water in the tank, with the pumping means operable to convey water from below the surface of the, at least one, tank to the intermediate portion of the crossover bridge structure in the filling mode.

* * * * *